US012791706B2

(12) United States Patent
Menè et al.

(10) Patent No.: US 12,791,706 B2
(45) Date of Patent: Nov. 10, 2026

(54) SURVEILLANCE OF AIRPORT MANOEUVRING AREAS AND APRONS USING VISUAL AIDS AND SURVEILLANCE INFRASTRUCTURE

(71) Applicant: ADB Safegate BV, Zaventem (BE)

(72) Inventors: Luca Menè, Palm Jumeirah (AE); André Jelu, Hoegaarden (BE); Martin Le Roux, Huldenberg (BE)

(73) Assignee: ADB Safegate BV, Machelen (BE)

( * ) Notice: Subject to any disclaimer, the term of this patent is extended or adjusted under 35 U.S.C. 154(b) by 309 days.

(21) Appl. No.: 18/578,915

(22) PCT Filed: Jul. 15, 2022

(86) PCT No.: PCT/EP2022/069837
§ 371 (c)(1),
(2) Date: Jan. 12, 2024

(87) PCT Pub. No.: WO2023/285644
PCT Pub. Date: Jan. 19, 2023

(65) Prior Publication Data

US 2024/0345245 A1 Oct. 17, 2024

(30) Foreign Application Priority Data

Jul. 16, 2021 (EP) .................................... 21186216

(51) Int. Cl.
*B64F 1/20* (2006.01)
*G01S 13/02* (2006.01)
(Continued)

(52) U.S. Cl.
CPC .............. *G01S 13/934* (2020.01); *B64F 1/20* (2013.01); *G01S 13/0209* (2013.01); *G08G 5/51* (2025.01);
(Continued)

(58) Field of Classification Search
CPC ...... G01S 13/934; G01S 13/0209; G01S 5/12; G01S 2205/03; G01S 13/765; B64F 1/20;
(Continued)

(56) References Cited

U.S. PATENT DOCUMENTS 7,495,600 B2 * 2/2009 Rees ..................... G01S 13/723 342/36
2015/0175162 A1 * 6/2015 Nakadori .............. B60W 30/16 701/96

FOREIGN PATENT DOCUMENTS

CN 107820215 A 3/2018
CN 110510142 A * 11/2019 ................ B64F 1/32
(Continued)

*Primary Examiner* — Timothy A Brainard
*Assistant Examiner* — Bongani Jabulani Mashele
(74) *Attorney, Agent, or Firm* — Rankin, Hill & Clark LLP

(57) ABSTRACT

Ultra-wideband positioning system (100) for determining a position of at least one entity (200) on an airport field comprising at least one of a manoeuvring area (310) and an apron (350), said system comprising: —at least one airport light-signalling device (801), in particular an approach light, a runway light, a taxiway light, an elevated light, an inset light, a light box, or a visual docking guidance system, said device (801) being located on or around the least one of the manoeuvring area (310, 320) and the apron (350); wherein the at least one airport light-signalling device (801) comprises a positioning unit (400) being arranged in or on the at least one airport visual-signalling device (801), said unit (400), —a position determining unit (700) in data communication with the positioning unit (400) of the at least one airport light-signalling device (801), said position determining unit (700) being configured to calculate the position of the at least one entity (200).

20 Claims, 14 Drawing Sheets

(51) Int. Cl.

| | |
|---|---|
| ***G01S 13/934*** | (2020.01) |
| ***G08G 5/51*** | (2025.01) |
| ***G08G 5/72*** | (2025.01) |
| ***H04W 4/029*** | (2018.01) |
| ***H04W 4/40*** | (2018.01) |

(52) U.S. Cl.
CPC ............. *G08G 5/727* (2025.01); *H04W 4/029* (2018.02); *H04W 4/40* (2018.02)

(58) Field of Classification Search
CPC .......... B64F 1/002; G08G 5/51; G08G 5/727; H04W 4/029; H04W 4/40
See application file for complete search history.

(56) References Cited

FOREIGN PATENT DOCUMENTS

| | | | | | |
|---|---|---|---|---|---|
| CN | 112533129 | A | * | 3/2021 | ............ H04W 64/00 |
| CN | 112666544 | A | * | 4/2021 | ............. G01S 13/87 |
| EP | 3828593 | A1 | * | 6/2021 | ............ B60L 3/0015 |
| WO | WO-2009133102 | A1 | * | 11/2009 | ............. G01S 13/91 |

* cited by examiner

SURVEILLANCE OF AIRPORT MANOEUVRING AREAS AND APRONS USING VISUAL AIDS AND SURVEILLANCE INFRASTRUCTURE

CN110510142 A discloses an airport luggage transport vehicle remote positioning using ultra-wide band signals. US 2005/0140540 A1 discloses an airport surface target tracking system using a network of distributed multilateration sensors and distributed W-band radar sensors.

TECHNICAL FIELD

The present invention is related to an ultra-wideband based positioning system integrated into an airfield lighting device of at least one entity on an airport field and a surveillance system for an airport comprising said positioning system.

BACKGROUND ART

The main goal of air traffic surveillance is to provide safe and efficient movement of passengers from a departure point A to a destination point B across the globe. Historically, Air Traffic Surveillance (ATS) has been achieved through the use of radars in conjunction with the radio communication between pilots and air traffic controllers. A surveillance system is typically required to provide periodically an accurate estimate of the position of all targets within the area of responsibility and possibly identification and altitude of each detected entity, a.k.a. target.

Traditional ATC (Air Traffic Control) radars, called primary radars, are provided with a rotating antenna which transmits continuously radar pulses and receives back the return energy (radar echo) reflected by any entity (target) within their coverage volume. The range of the target is then calculated by the two-way time of flight while the bearing of the target is based on the current antenna position. Such radars allow detection and ranging of any target with a certain level of reflectivity (radar cross section) based on their distance. These radars do not provide either altitude or identification of targets.

Because of the above limits of standard primary radars, cooperative sensors were introduced in the ATC scenario in the early 1960's. Cooperative sensors, also called secondary surveillance radars (SSR), were developed to improve the ATC surveillance proving, in addition to an extended coverage, additional surveillance data, mainly target identification and altitude. The main difference between primary radars and cooperative sensors was the need of an onboard "cooperative" equipment, the aircraft transponder, able to respond to the secondary radar interrogations and transmit back the additional information. Limit of this technology was the fact that the non-cooperative targets (either no transponder or transponder off) cannot be detected.

Several forms of cooperative technologies were developed since then which could work either stand alone or integrated with primary surveillance, although the combination of primary and secondary surveillance guarantees the optimal solution because it takes advantage of both the higher safety of primary surveillance and higher performance of secondary surveillance.

With the introduction of the A-SMGCS System (Advanced surface movement guidance and control system), ground surveillance systems started to play a major role and two main technologies were introduced: Surface Movement Radars (SMRs), also called Ground Movement Radars (GMR) or Airport Surface Detection Equipment (ASDE), as primary surveillance source, and the Multilateration system (MLAT) as main secondary surveillance source. In addition, the MLAT systems are typically provided with an ADS-B (Automatic Dependent Surveillance-Broadcast) channel which receives the aircraft GPS position from the aircraft transponders and handles it as an additional, independent secondary surveillance source, which in this case is cooperative and "dependent", as the quality of the surveillance data relies on the accuracy of the aircraft navigation system, causing some major safety concerns.

A Multi Sensor Fusion system can be installed in the ATC to integrate and fuse then the surveillance data coming from the different systems (MLAT and one or more SMRs).

Definition—Visual Aids (a.k.a. airport signalling device) are any device used providing visual guidance to pilots for landing, take off and ground movement until the park position of the aircraft. Visual Aids comprise Aeronautical Ground lighting (AGL) lights and Visual Docking Guidance Systems (VDGS).

CN110510142 A discloses an airport luggage transport vehicle remote positioning using ultra-wide band signals. Limitations and Drawbacks of the Standard Ground Surveillance Technologies.

Standard ground surveillance systems have several drawbacks. First of all, both SMR and MLAT/ADS-B technologies are quite expensive and as mentioned before the combination of both is required in order to take advantage of the higher performance of the secondary surveillance (MLAT) and the higher safety of the primary surveillance. In addition, the cost for civil and electrical works required to install the systems and to provide them with network connection to the Air Traffic Control Tower typically is almost comparable to the cost of the procurement of the systems. Indeed, for coverage and redundancy reasons, medium/large size airports require typically a large set of MLAT sensors (above 30) and more than 1 SMRs per runway. Each SMR typically also requires the construction of a radar tower 20/30 m high and related equipment shelter. Such high cost for procurement installation and deployment of these surveillance systems represent a high limit in the development or upgrade of the ground surveillance systems in several airports.

From a technical point of view, it is important to notice that SMR coverage is typically limited to the manoeuvring areas, so all the apron and parking areas are excluded as too "cluttered" and also MLAT performance are typically affected in apron areas where the number of obstacles and reflecting elements increase dramatically. The international standards (ED-87C) require an overall positional accuracy of 12.5 m in 95% of the cases in the manoeuvring areas, 20 m in 95% of the cases in the apron taxiways and aircraft stand taxi lanes and 25 m in 95% of the cases at the stands.

By manoeuvring area is meant the part of an aerodrome to be used by aircraft for take-off, landing, and taxiing, excluding aprons and areas designed for maintenance of an aircraft.

Due to the difficulty in covering aprons and parking areas many airports have often to implement video coverage of specific areas of the airport to remedy the low accuracy or eventual coverage gaps of the surveillance systems. This solution has also its weak points though, especially during bad weather conditions, and increases the already high costs of the surveillance systems as well as their maintenance costs.

SUMMARY OF THE INVENTION

There is therefore a need in the art of providing an aerodrome accurate positioning system coverage. Equally, a need exists for an improved identification of the objects/persons, especially in apron area. There is also a need in the art of providing aerodrome positioning systems allowing easier maintenance and monitoring.

According to a first aspect of the invention, there is therefore provided an ultra-wideband positioning system for determining a position of at least one entity on an airport field comprising at least one of a manoeuvring area and an apron, said system comprising:

at least one airport light-signalling device, in particular an approach, light a runway light, a taxiway light, an elevated light, an inset light, a light box, an approach light or a visual docking guidance system, said device being located on or around the least one of the manoeuvring area and the apron;

wherein the at least one airport light-signalling device comprises a positioning unit being arranged in or on the at least one airport light-signalling device, said unit comprising an ultra-wideband module configured to at least transmit at least one ultra-wideband pulse radio outbound signal, in particular in direction of the at least one entity and to receive at least one ultra-wideband pulse radio signal sent spontaneously, returned or echoed by the at least one entity, or receive at least one ultra-wideband pulse radio signal sent spontaneously, returned, or echoed by the at least one entity;

a position determining unit in data communication with the at least one positioning unit of the at least one airport light-signalling device, said position determining unit being configured to calculate the position of the at least one entity using positioning data extracted at least from the at least one ultra-wideband pulse radio signal sent spontaneously, returned or echoed by the at least one entity.

According to a second aspect of the invention, there is provided a surveillance system for an airport field, comprising at least one ultra-wideband positioning system, said ultra-wideband positioning system comprising a position determining unit and the positioning unit of the at least one airport light-signalling device, said surveillance system further comprising a central monitoring unit being configured to monitor at least one entity on the airport field including at least one of a manoeuvring area and an apron, said central monitoring unit being configured for data communication with the position determining unit, said position determining unit being configured to send ultra-wideband positioning data extracted from positioning data received from the positioning unit of the at least one at least one airport light-signalling device By "an ultra-wideband module configured to at least transmit at least one ultra-wideband pulse radio outbound signal, in particular in direction of the at least one entity and to receive at least one ultra-wideband pulse radio signal sent spontaneously, returned or echoed by the at least one entity, or receive at least one ultra-wideband pulse radio signal sent spontaneously, returned, or echoed by the at least one entity" is meant either:

an ultra-wideband module configured to at least transmit at least one ultra-wideband pulse radio outbound signal, in particular in direction of the at least one entity and to receive at least one ultra-wideband pulse radio signal sent spontaneously, returned or echoed by the at least one entity, an ultra-wideband module configured to receive at least one ultra-wideband pulse radio signal sent spontaneously, returned or echoed by the at least one entity, or an ultra-wideband module that can be switched in a first mode or a second mode, in case the first mode is selected, the ultra-wideband module is configured to at least transmit at least one ultra-wideband pulse radio outbound signal, in particular in direction of the at least one entity and to receive at least one ultra-wideband pulse radio signal sent spontaneously, returned or echoed by the at least one entity, or in case the second mode is selected, the ultra-wideband module is configured to receive at least one ultra-wideband pulse radio signal sent spontaneously, returned or echoed by the at least one entity.

Advantageously, the above mentioned positioning system utilizing Ultrawideband technology integrated into airfield lighting devices installed in high numbers across the manoeuvring area of an airport provides both primary and secondary ground surveillance with a higher coverage, better positional accuracy of objects (Aircraft, Vehicle) or foreign object debris detection compared to classical surface movement technologies (MLAT, SMR).

BRIEF DESCRIPTION OF THE FIGURES

Aspects of the invention will now be described in more detail with reference to the appended drawings, wherein same reference numerals illustrate same features and wherein.

DETAILED DESCRIPTION

Figure 1:
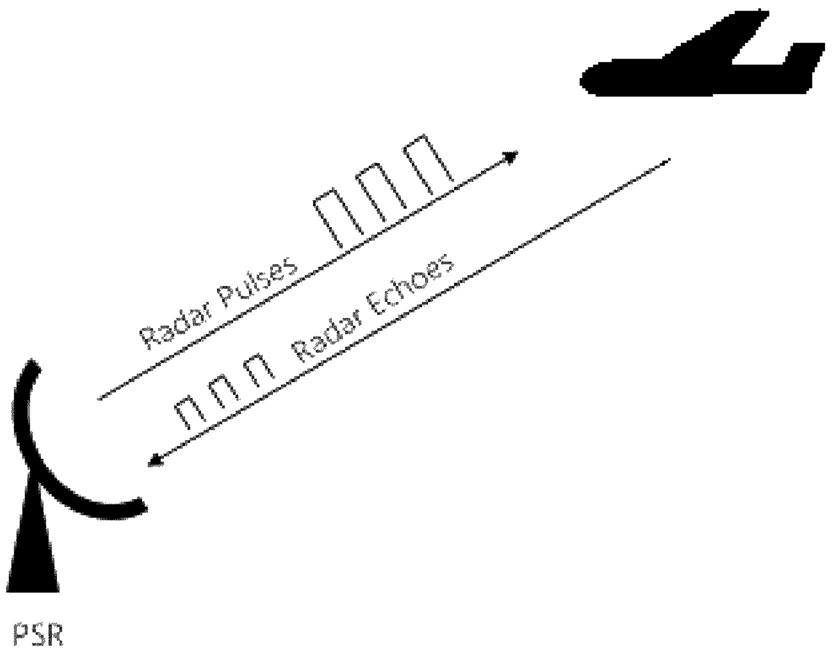
Fig. 1 (Prior art)
FIG. 1 represents a traditional air traffic control radar, also called primary radars, according to the state of the art.

This disclosure concerns the use of ultra-wideband devices 410, like a chip within airfield fixtures 801,802 such as airport signalling device 801 and/or airport surveillance stationary device 802 to transmit radar pulse signals 501, 502 and locate moving and fixed targets 200, also called entity with a high degree of accuracy. By ultra-wideband (UWB) is meant a pulse radio whose frequency lies in the range of 3.1 to 10.6 GHz range. By an airport signalling device (also known as signalling unit) 801 is meant a visual aid. We understand by an airport surveillance stationary device a fixture/device/apparatus dedicated to an airfield surveillance (e.g. camera, a multilateration antenna mast).

An ultra-wideband (UWB) transmitter/receiver module 410 such as transceiver is installed within the airfield visual aids 801 (e.g. runway lights, taxiway lights, elevated lights, approach lights, visual docking guidance system (VDGS), signs, etc.), hereby called UWB sensing visual aids 801.

In one embodiment, the sensing visual aid 801 transmits a radar pulse 501 signal which hits a target 200 in coverage and bounces back. The two-way time of flight of the radar signal 501, 601 is used to determine the ranging of the target 200.

Other techniques like angle of arrival estimation or use of multiple directional antennas are used to determine the bearing of the targets 200. The short pulses of UWB technology (order of nanoseconds) allow higher accuracy and resolution than standard ATC systems with no difference in performance between apron 350 and manoeuvring areas 310, 320.

FIG. 1 shows a traditional ATC (Air Traffic Control) radars, called primary radars, provided with a rotating antenna which transmits continuously radar pulses and receives back the return energy (radar echo) reflected by any entity (target) within their coverage volume. The range of the target is then calculated by the two-way time of flight while the bearing of the target is based on the current antenna position. Such radars allow detection and ranging of any target with a certain level of reflectivity (radar cross section) based on their distance. These radars do not provide either altitude or identification of targets.

Figure 2:
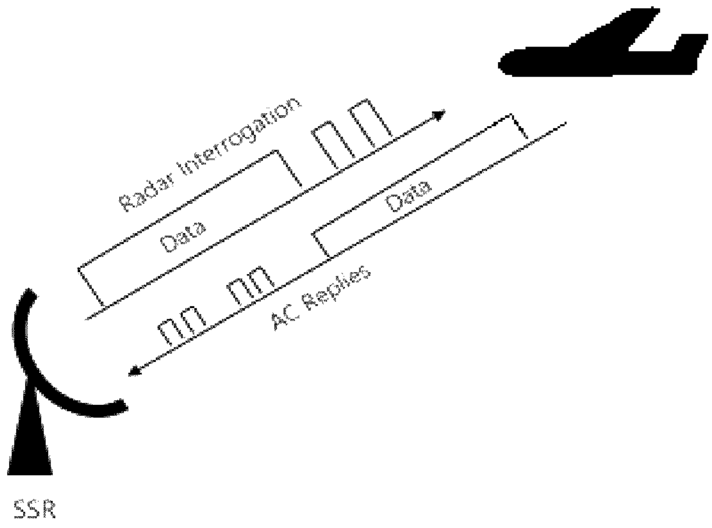
Fig. 2 (Prior art)
FIG. 2 represents a cooperative sensors, also called secondary surveillance radars (SSR), according to the state of the art.

FIG. 2 shows a cooperative sensor, also called secondary surveillance radars (SSR). The main difference between primary radars and cooperative sensors is the need of an onboard "cooperative" equipment, the aircraft transponder, able to respond to the secondary radar interrogations and transmit back the additional information. Limit of this technology is the fact the non-cooperative targets (either no transponder or transponder off) cannot be detected.

Figure 3:
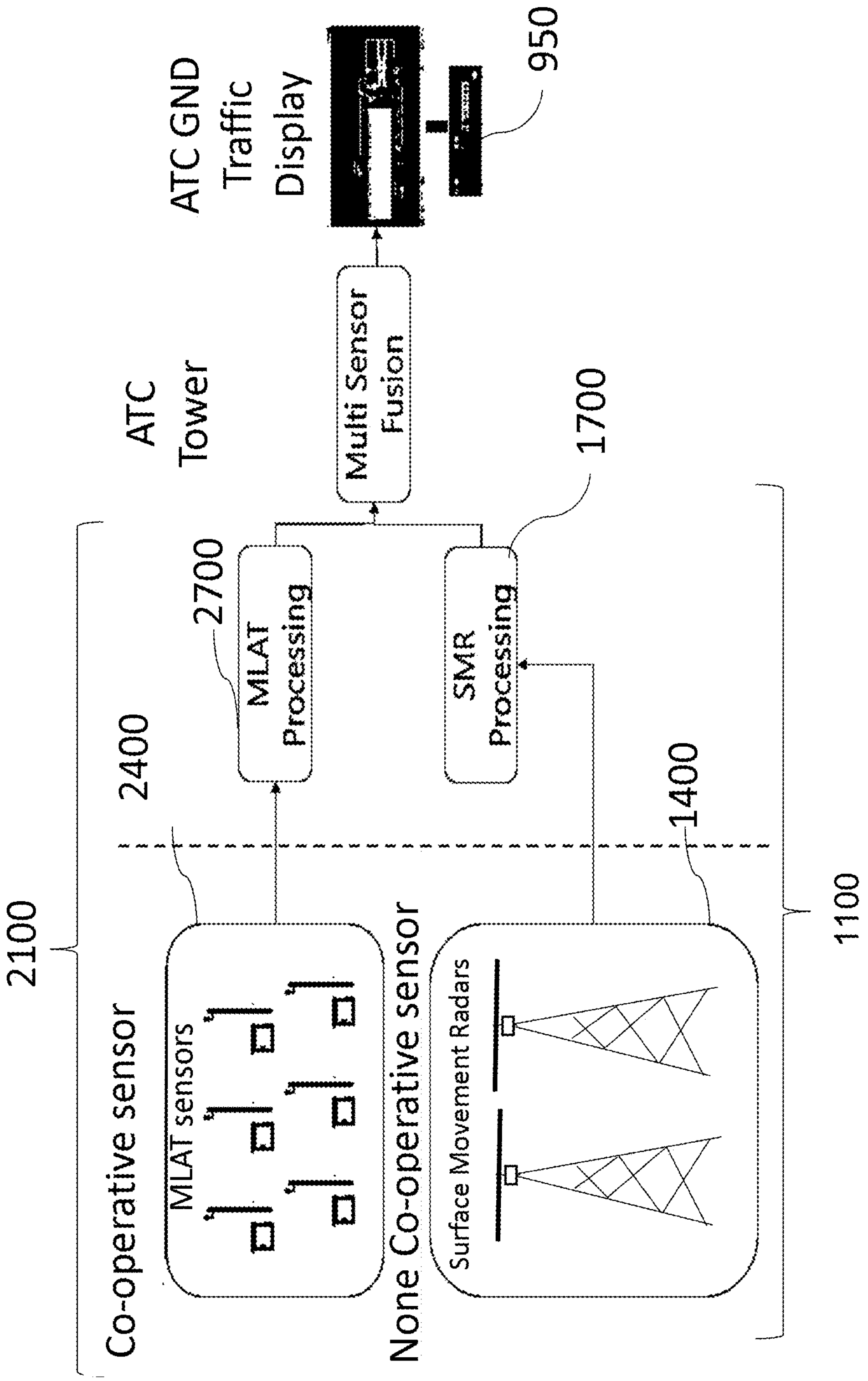
FIG. 3 represents a multi sensor fusion system of primary surface movement radars and an MLAT system, according to the state of the art.

FIG. 3 shows a multi sensor fusion system installed in the ATC to integrate and fuse then the surveillance data coming from the different systems (MLAT and one or more SMRs). Surface Movement Radars (SMRs), also called Ground Movement Radars (GMRs) are used as primary surveillance source, and the Multilateration system (MLAT) as main secondary surveillance source. In addition, the MLAT systems are typically provided with an ADS-B (Automatic Dependent Surveillance-Broadcast) channel which receives the aircraft GPS position from the aircraft transponders and handle it as an additional, independent secondary surveillance source, which in this case is cooperative and "dependent", as the quality of the surveillance data rely on the accuracy of the aircraft navigation system, causing some major safety concerns.

Figure 4:
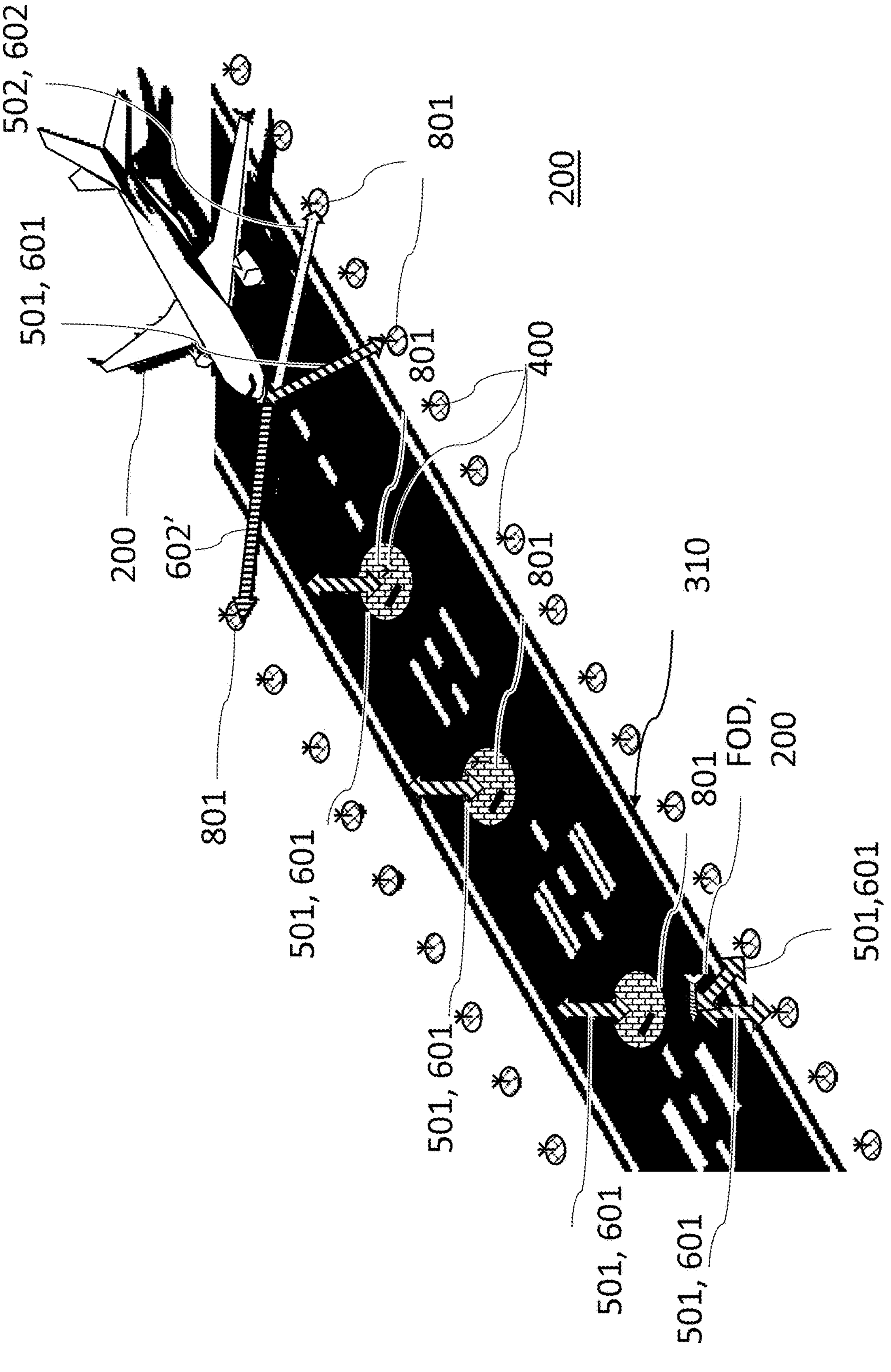
FIG. 4 represents an ultra-wideband positioning system according to the invention adapted to a runway.

FIG. 4 represents an ultra-wideband positioning system according to the invention adapted to a runway 310. The moving entity is an airplane 200 and the runway 310 comprises grounded central lights 801 provided with UWB pulse radars 410 for detecting the passage of the airplane 200 using an outbound 501 and echoed return signal 601 (complementary or alternatively the grounded central lights 200 can be configured to send outbound poll 601 signal or receive return reply 602). The lights 801 disposed on both long sides in FIG. 4 are adapted to allow a positioning of the airplane, vehicle (not shown) or foreign object debris FOD 200. The positioning can performed through the calculation of the time of flight of either:

- the outbound 501 and return signals 601 bouncing on the airplane or foreign object debris FOD, or
- the outbound 601 poll and reply signal 601 sent by the airplane 200.

Furthermore, the lights 801 comprise UWB transceivers 410 adapted to receive an UWB signal 602' periodically sent from an onboard UWB transceiver of the airplane 200. The times of flights of the UWB signal 601 detected by the runway UWB transceivers 410 fixed to the lights 801 disposed on both long sides of the runway 310 are sent to a positioning determining unit 700 (not shown) where the exact coordinates of the airplane 200 are determined. These coordinates of the airplane 200 can be compared with those determined by the grounded central lights 801, enhancing the reliability of the positioning. The embodiment in FIG. 4 illustrates that lights 801 can perform both primary (via 501, 601 signals) and secondary surveillance (502, 602, 602') independently or complementary to surface movement radars (SMRs not shown in FIG. 4) and the multilateration system (MLAT not shown in FIG. 4), which are the traditional sensors for primary and secondary surveillance, respectively. FIG. 4 illustrates one way to carry out the invention. The scope of the invention should not be restricted to this advantageous embodiment since several modifications starting from FIG. 4 within the scope of the claims can be foreseen. For example the lights 801 can be used to monitor the positioning not only of airplanes 200 but also service vehicles, staff circulating on critical airfield areas (e.g. apron, taxiway).

Figure 5:
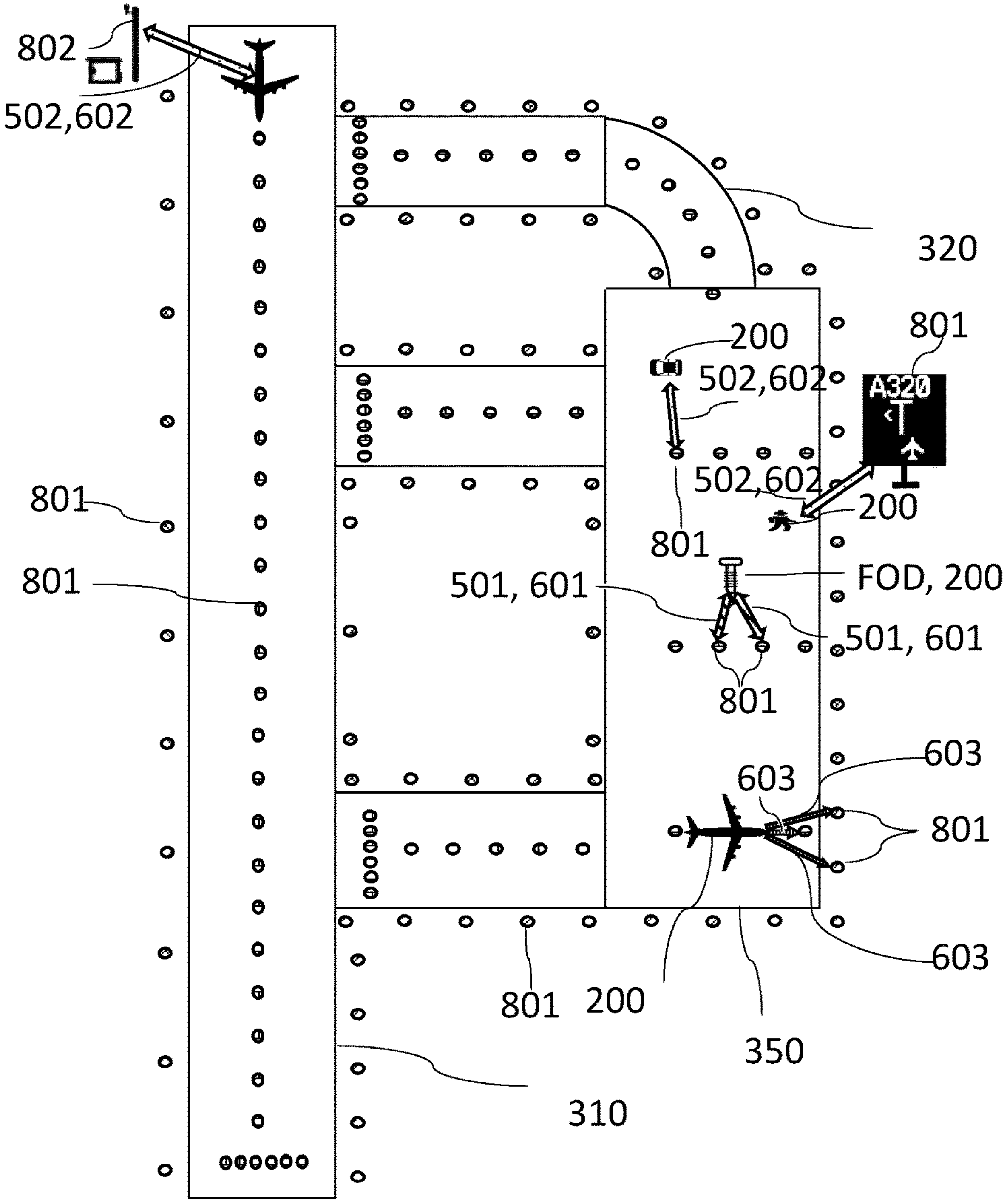
FIG. 5 represents an ultra-wideband positioning system according to the invention adapted to an apron.

FIG. 5 represents another embodiment of the invention where the positioning units 400 are fixed to aeronautical ground lights 801 and spread over a runway 310, taxiways 320 and an apron 350. The positioning units 400 can perform both primary surveillance through detection of echoed signals 601 and secondary surveillance via reception of return signals 602 containing position and identification data. Furthermore, the positioning units 400 can be further configured to positioning an entity 200 using time of arrivals of returns signals 603.

The use of UWB signals guarantees also high resilience to multipath especially in busy airfield areas like aprons and parking stands. In addition, the system, thanks to the UWB technology, results also immune to interferences of other radio transmissions within the airport and secure against potential spoofing.

The installation of the surveillance within the AGL fixture 801 avoid the installation costs and guarantee a distribution of sensors across all manoeuvring areas and parking stands.

Furthermore, the power consumption of standard surveillance radars 1400, 2400 can be completely eliminated by the disclosed surveillance solutions guaranteeing also a huge step in the direction of green airfields.

This disclosure includes the possibility to connect all the sensing UWB visual aids 801 with a surveillance processing 900 able to combine data from all sensors 400 in a unique surveillance data output. The surveillance processing 900 may be able to combine the detections from all sensors 400 and accurately calculate also the size, the speed of the targets 200 and their direction. The data output may follow standard Eurocontrol format (Asterix) in order to be immediately compatible with the other ATC systems.

The size of the aircraft 200 may be calculated based on the amount and identity of the sensors 400 detecting the aircraft simultaneously.

The combination of such a large set of distributed UWB sensors 400 increases not only the overall accuracy but also the system probability of detection.

Furthermore, the high accuracy and resolution of UWB measures allow the use of this radar technology also for detection of Foreign Objects Debris 200 (FOD) which cause sever safety issues in airport operations and cause annually damages and delays.

The FOD detections and alerts may be presented to a dedicated HMI 950 (Human Machine Interface) for the airfield maintenance and safety teams.

The communication between sensing visual aids 801 and central surveillance processing 900 may be implemented via different communication links.

Figure 6:
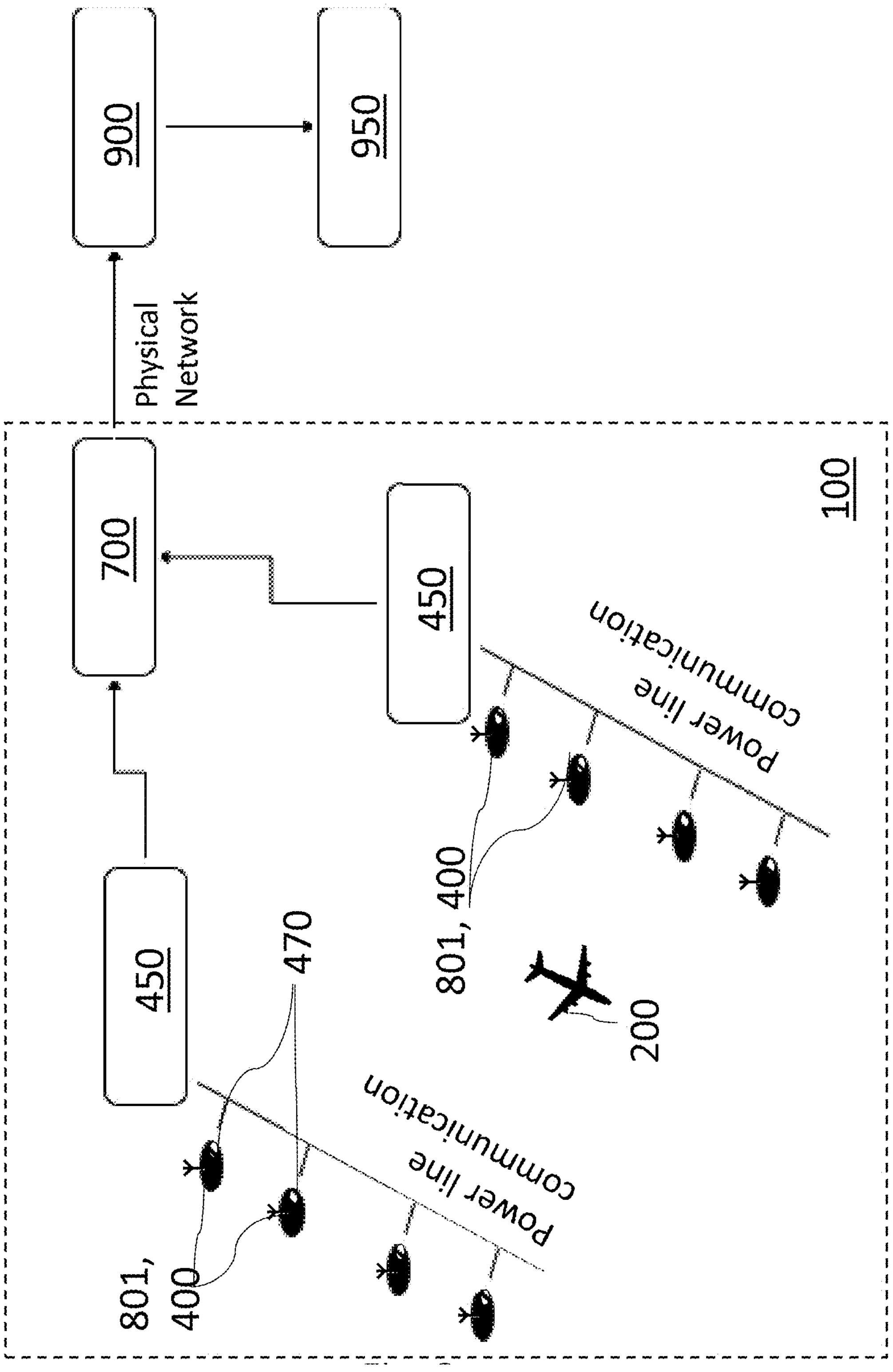
FIG. 6 represents an ultra-wideband positioning system comprising a powerline communication operatively connecting ultra-wideband positioning units to a relay communication unit.

As a first option, the powerline communication channel used by the AGL equipment 801 may be used to connect the field sensors 400 via a communication interface 470 to a surveillance data receiving unit 450 in the AGL substations. This receiving unit 450 is then connected via physical network connection to the surveillance central processing 900, as shown in FIG. 6.

Figure 7:
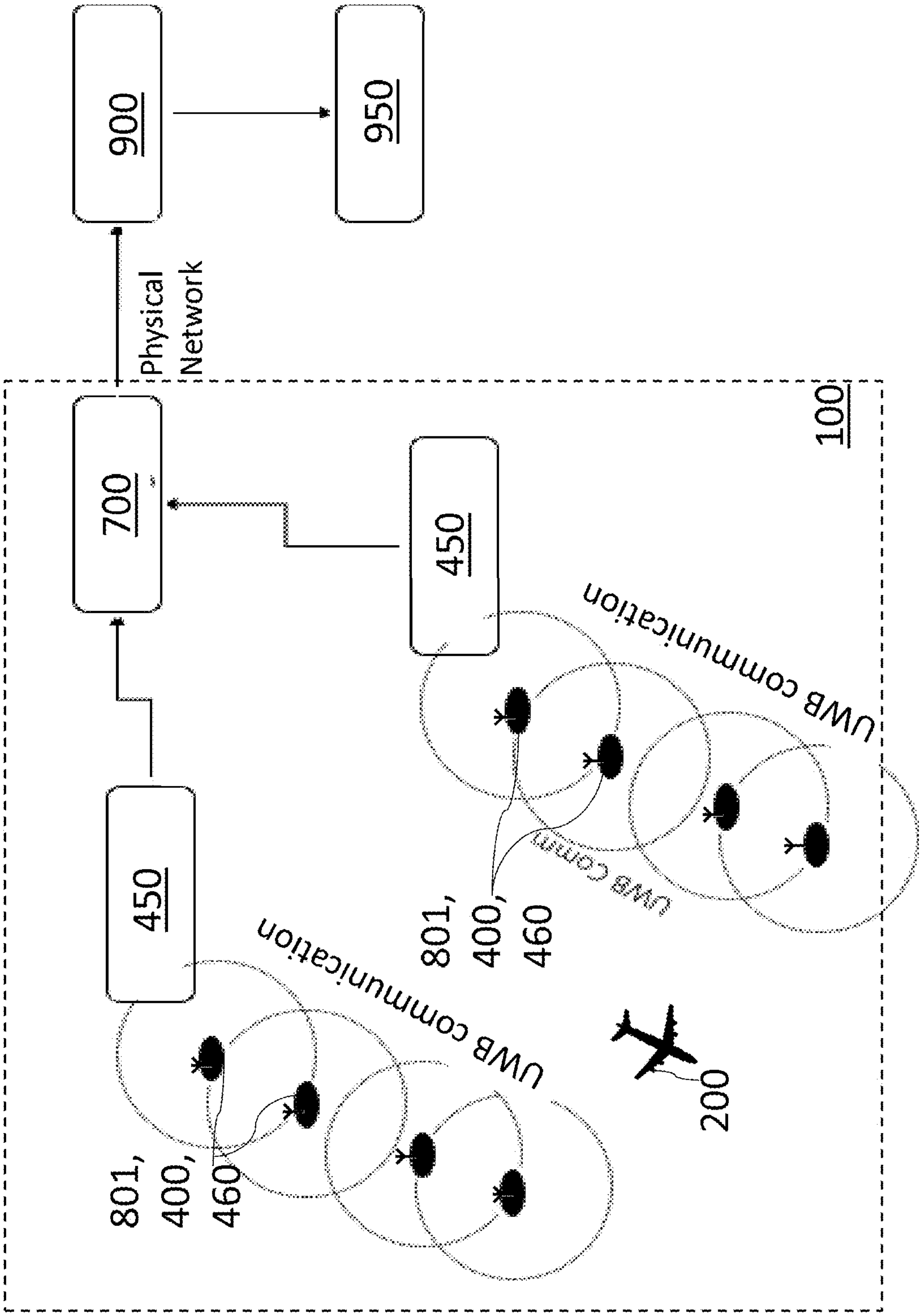
FIG. 7 represents an ultra-wideband positioning system comprising an ultra-wideband communication network operatively connecting ultra-wideband positioning units to a relay communication unit.

Alternatively or in addition to the previous paragraph, the UWB data communication capability 460 could be used to set up a dedicated network and transmit data from the UWB devices 410 to a receiving unit 450 in the substation, as shown in FIG. 7.

Figure 8:
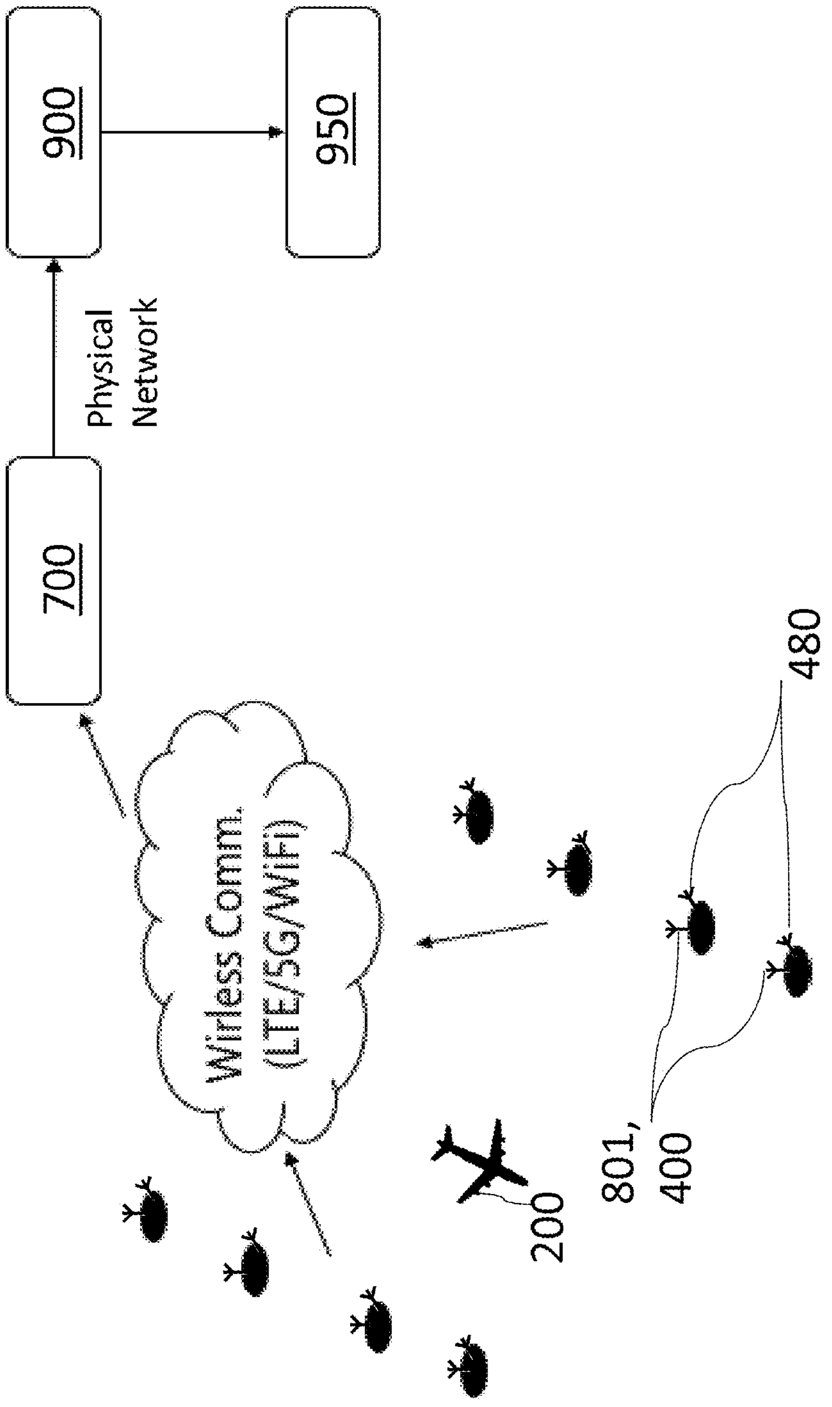
FIG. 8 represents an ultra-wideband positioning system comprising a wireless communication network operatively connecting ultra-wideband positioning units to a positioning determining unit.
Figure 9:
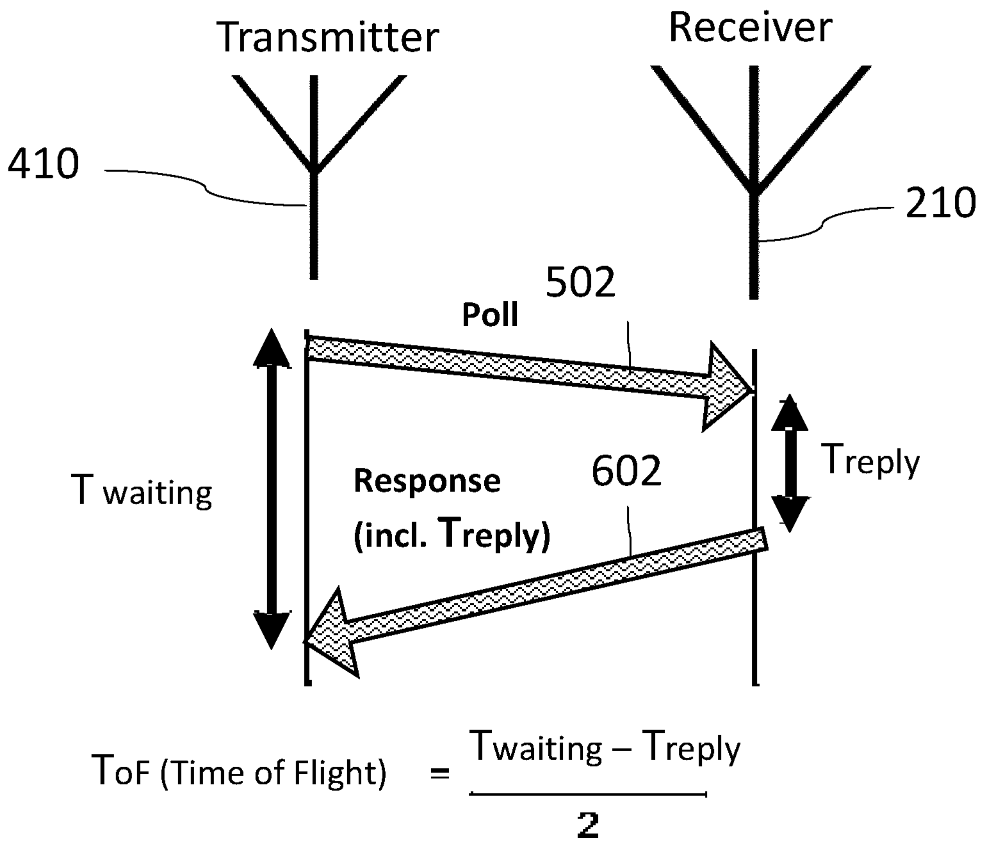
FIG. 9 shows an ultra-wideband communication and ranging between peer devices.

Alternatively or in addition to the previous paragraph, in case the visual aids 801 are equipped with LTE/5G modem 480, and there is an LTE/5G private network in place in the airport, the surveillance data can be transmitted wireless to the central processing 900 via the position determining unit (700), as shown in FIG. 8.

The present invention includes also the possibility to use the same UWB device 410 to locate and also identify other UWB peer devices 200 within its coverage range and use the UWB technology as an alternative to the standard 1090 MHz communication channel for ground cooperative surveillance.

The UWB visual aids 801 and the other UWB radios 410, for instance mounted airport surveillance stationary device 802 can initialize a communication exchange that is used for accurate ranging but also data exchange (e.g. target identification, target speed, target mission, target planned trajectory, etc.).

Figure 10:
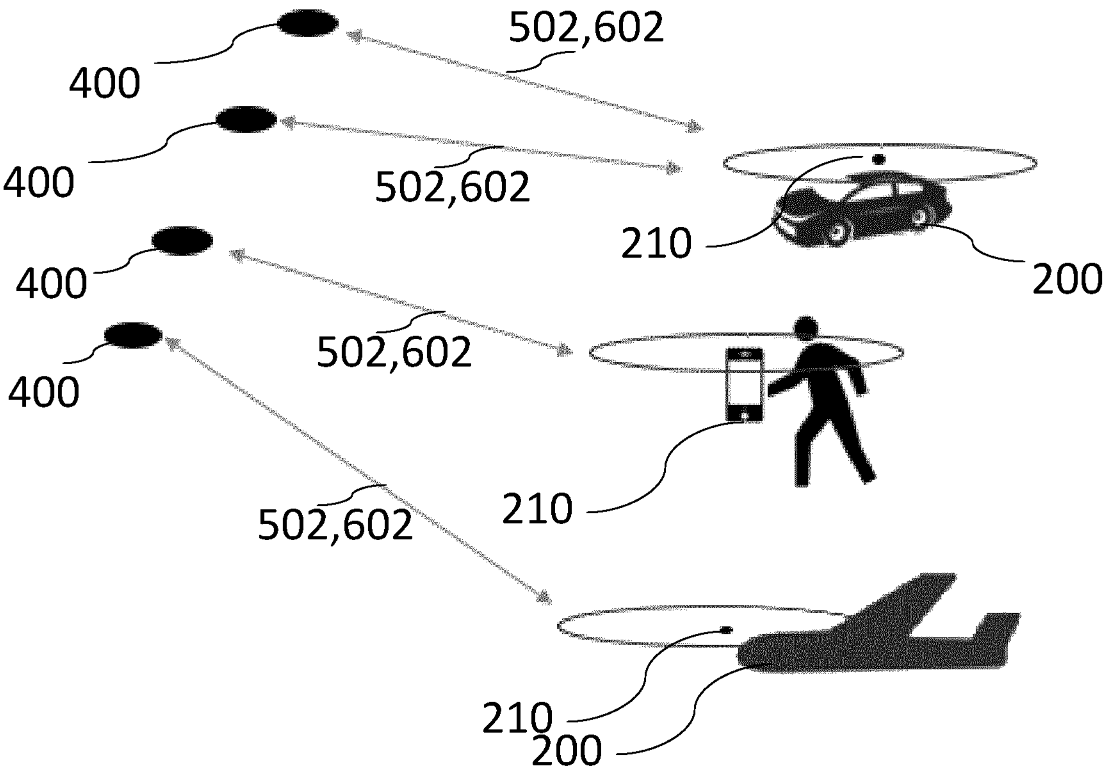
FIG. 10 shows an ultra-wideband application as secondary surveillance system.

UWB devices 210 may be installed within any vehicle 200 accessing the airfield as a cheaper solution in alternative to expensive standard 1030-1090 MHz ADS-B transponders, as shown in FIG. 10.

In addition to lower costs, these new vehicle cooperative UWB will also avoid reduction of the utilization of the 1090 MHz band that is already quite congested by all the existing ground-air communications initiated by the secondary surveillance radars and MLAT systems as well as by the air-air communication between aircraft transponders (TCAS).

In addition, each physical person accessing the airfield may be provided with his own UWB device 210 in order to be detected and identified by the installed sensing UWB visual aids 801. Personal UWB devices 210 may be provided in either personal tags 200 or mobile phones 200 provided with UWB capability and dedicated mobile application, as shown in FIG. 10.

Similarly, the disclosed sensing devices are provided with the capability to detect and communicate with any aircraft 200 embarking a UWB device 210, as shown in FIG. 10.

This technique allows to combine the ranging of the same target 200 by several receivers 410 and calculate the target position accurately via triangulation or Time Difference of Arrival algorithms allowing to reach accuracy of the order of cm.

As an alternative, the angle of arrival can be measured by a single UWB sensor 400 with multiple antennas so that the bearing information together with the range information provide the exact location of the device 200.

Figure 11:
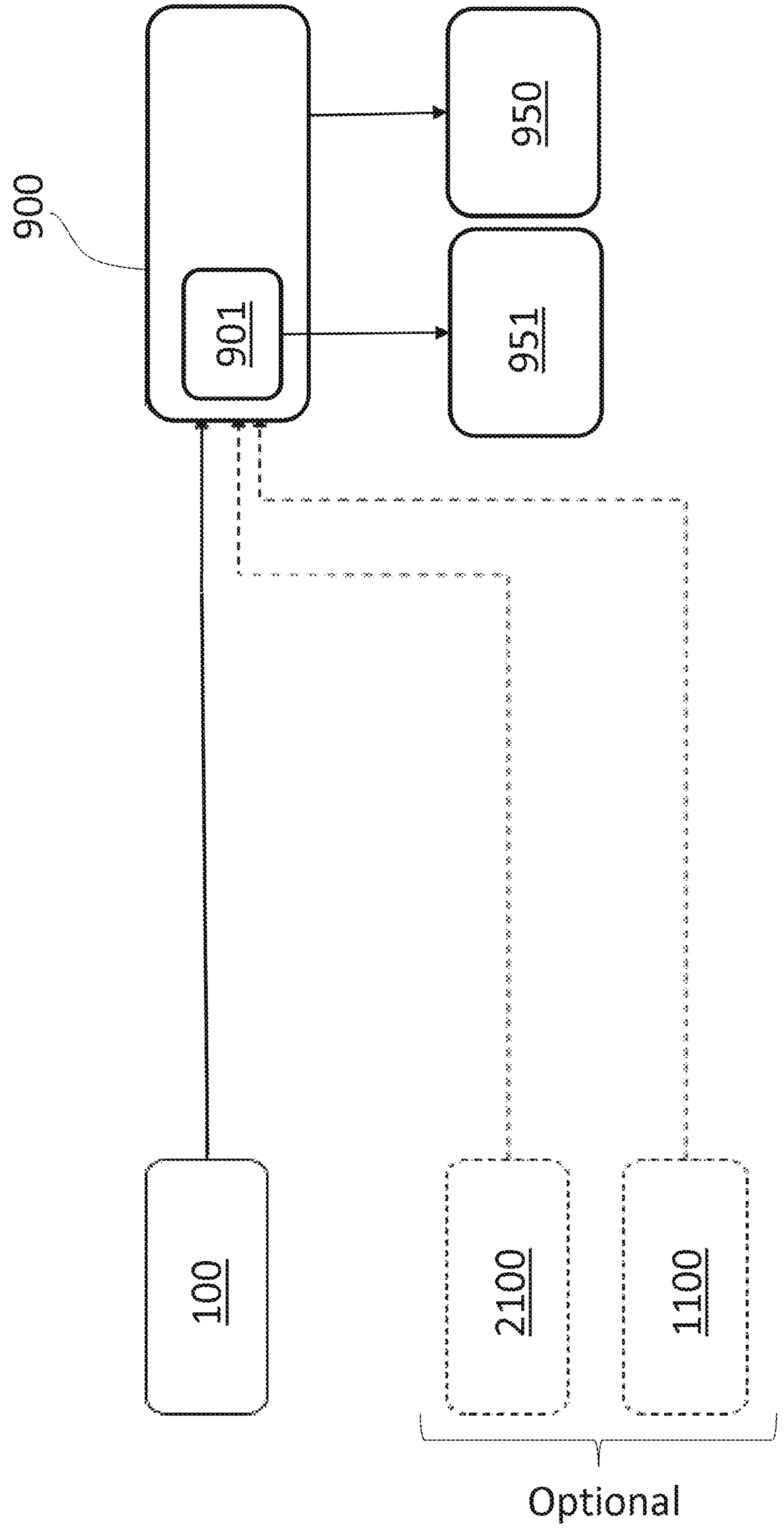
FIG. 11 illustrates an air traffic control ground surveillance based on an ultra-wideband positioning as an alternative or complementary to standard positioning.

The combined use of this network of UWB sensing devices 400 for both primary surveillance (radar pulses 501, 502) and secondary surveillance (UWB ranging and communication between peer devices) forms a unique ground surveillance system capable to deliver with one single system both primary and secondary (cooperative) surveillance to ATC system, shown in FIG. 11.

The surveillance system 900 may produce a single output for both primary surveillance and secondary surveillance as well as a fused surveillance output that combine the surveillance data from both traditional surveillance chains 1100, 2100, namely SMR and MLAT systems. All output may follow Eurocontrol Standard formats (Asterix).

Such combined surveillance system 900 will have a coverage of all ground maneuvering areas and all aprons and parking stands, as long as the UWB sensing visual aids 801 are installed instead of standard AGL fixtures.

The surveillance system 900 may further comprise a processing unit 901 dedicated to the monitoring of Foreign Object Debris FOD 200. A dedicated human machine interface HMI 951 for monitoring the foreign object debris FOD is connected to the surveillance system 900 so as to receive the data to be displayed, as shown in FIG. 11.

Figure 12:
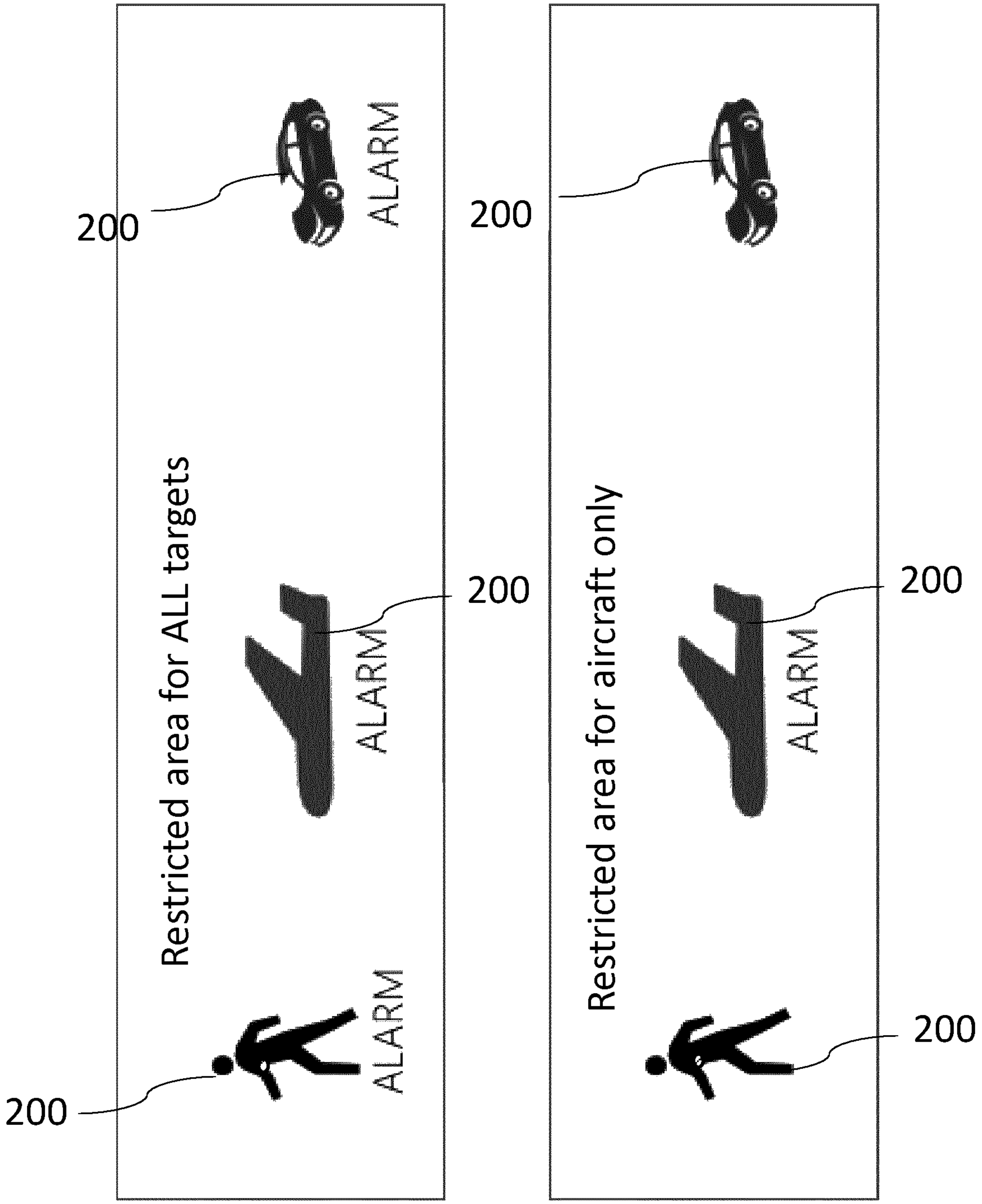
FIG. 12 illustrates an ultra-wideband application to restricted area alerts triggered by ultra-wideband detection.

Detection and identification of UWB devices 210 may be used to create restricted areas of different topology (e.g. areas restricted only for aircraft of a certain wing-span, area restricted for aircraft and vehicles, area restricted for non-authorized ground personnel) in the airport and generate alarms and warning based on the role/identity of the device that may be displayed on the ATC controllers Human Machine Interfaces, shown in FIG. 12.

Similarly, detection and identification of UWB devices 210 may be used to generate runway incursion alarms and other airport safety nets.

Once an alarm is generated it may be displayed in the HMI 950 and associated to an audible signal until an ATC controller acknowledges it.

In addition, the UWB communication channel may be used to transmit the warning directly to the taxing crew of the aircraft or vehicle, if it embarks the UWB device 210.

The use of the UWB technology as a secondary surveillance source could also allow either the surveillance system 900 or the ATC sensor data fusion to use the UWB surveillance to validate the aircraft GPS position broadcast via ADS-B messages, guaranteeing a safe use of the ADS-B data for ground surveillance.

Figure 13:
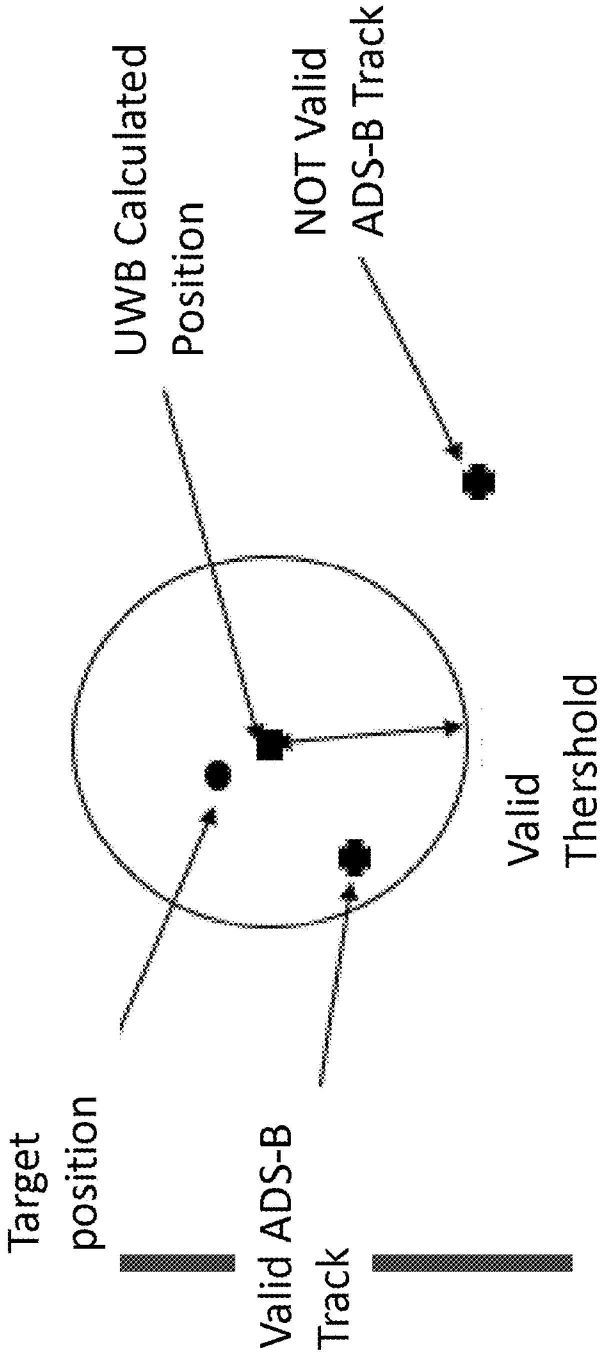
FIG. 13 shows an ultra-wideband application as an ADS-B validation via UWB detection.

In order to validate the quality of the ADS-B data of each aircraft, the UWB detection has to be compared with the received ADS-B position and mark as valid the ADS-B positions which are within a certain range threshold from the correspondent UWB detection, as shown in FIG. 13.

Once an ADS-B transponder is marked as "valid", the system may keep its validity for a certain duration of time from the last validation, achieved via comparison with the UWB surveillance data.

The use of this disclosed validation technique may allow airport to overcome the safety issues related to the ADS-B technology and install standalone ADS-B system without the need for a full MLAT deployment for standard 1090 MHz cooperative surveillance, guaranteeing same or better performance with a much cheaper solution.

Figure 14:
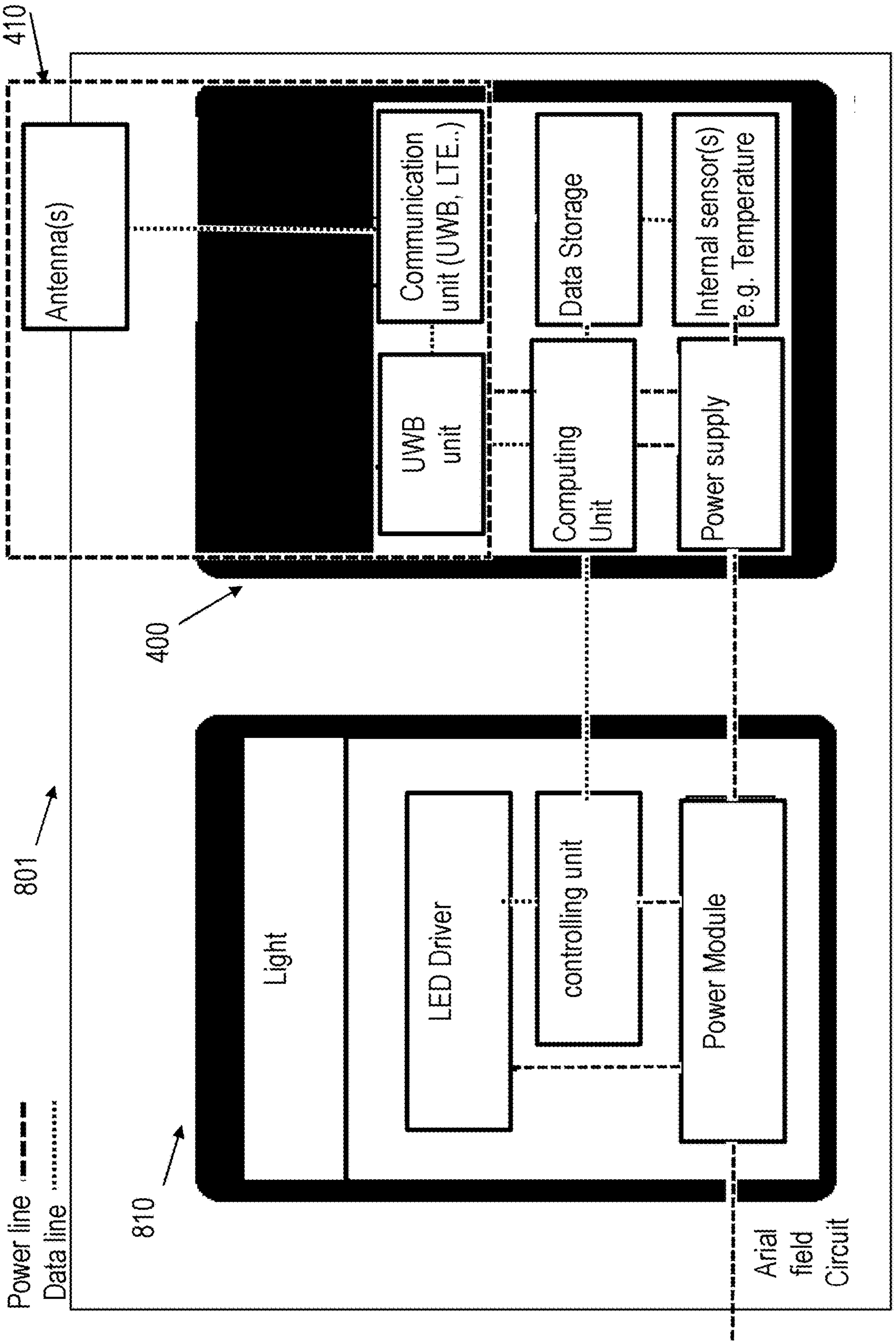
FIG. 14 shows an airport light-signalling device according to the invention.

FIG. 14 shows an airport light-signalling device 801, in which a positioning unit, namely a ranging device 400 is integrated. The ranging device 400 comprises an ultra-wideband module 410 that is adapted to receive one or more ultra-wideband pulse radio signals emitted or echoed by a moving entity 200 such as an aircraft taxing along. The one or more ultra-wideband pulse radio signals are received via one or more antennas of the ultra-wideband module 410 and transform said signal into raw positioning data. The ultra-wideband module 410 comprises besides the one or more antennas and UWB unit a communication unit. The communication unit is adapted to communicate with a computing unit. The computing unit is configured to receive (via the communication unit) and accumulate (in a Data storage) said raw positioning detection data received. The computing unit is also adapted to process the raw positioning data from the communication unit and to deliver positioning data to the communication unit. In the embodiment of FIG. 14, the communication unit is adapted to generate LTE (e.g. LTE 4G, LTE 5G) positioning data signals that are beamed/emitted to a position determining unit 700 not shown (not shown) via the one or more antennas. Other means of communication can be foreseen between the ultra-wideband module 410 and position determining unit 700, such as through the power line or using the UWB network formed by a network of ultra-wideband ranging device 400 spread over an airfield. The ranging devices 400 is powered by the airport light-signalling device 801. Besides the ranging device 400 comprises an autonomous power supply 440.

In FIG. 14, one communication unit with an hardware adapted to preform both UWV and LTE communication is presented. Alternatively, a first communication unit with its antenna for the UWB signals and a second communication unit with its antenna for the LTE signals can be foreseen.

In FIG. 14, the ranging device 400 forms an unit that is integrated in a "traditional" airport light-signalling device 801. Control interfaces between the ranging device 400 and the lighting module 810 ensure that the computing unit of ranging device 400 can control the controlling unit of the airport light-signalling device 801. This situation occurs when the light LTE control signals are received remotely via the one or antennas mounted on the ranging device 400 or via the UWB network formed by a network of ultra-wideband ranging devices 400.

A position determining unit 700 adapted to cooperate with the ranging device 400 of the airport light-signalling device 801 of FIG. 14 can comprise communication unit configured to exchange data wirelessly with the airfield device 801, in particular WiFi, LTE 4G, LTE 5G.

The position determining unit 700 comprises a centralized processor being configured to receive said positioning data send by the ranging devices 400 of the airport light-signalling device 801 and to determine therefrom a positioning of the above mentioned moving entity 200, namely an aircraft, based on said positioning data. The centralized processor can be configured to compare the positioning data sent by the ranging devices 400 of the airfield devices with data containing the predefined location of the airport light-signalling devices 801 spread over an airfield.

The centralized processor can be configured to identify the entity of the above mentioned moving entity 200 using the positioning data sent by the ranging devices 400 of the airport light-signalling device 801.

The centralized processor can be configured to merge the positioning data sent by the ranging devices 400 of the airfield devices to achieve high accuracy in the position calculation.

The centralized processor can be provided with a memory to store the calculated positions and the time of calculation of the above mentioned moving entity 200.

The centralized processor can be configured to process some or all calculated positions of the above mentioned moving entity 200, to calculate in a configurable time window with positions previously calculated and stored in the memory and to associate the ones related to the above mentioned moving entity 200.

The centralized processor can be configured to fuse and smooth the positions associated to the same target and generate a single final position update via a tracking filter, in particular Kalman filtering.

The centralized processor can be configured to transmit all smoothed or new calculated positions of the above mentioned moving entity 200 to an external user or higher level system such as the central monitoring unit 900.

The system according to the invention can also track several moving entities of different natures (e.g. pedestrian or airplane). Furthermore, the network of ranging devices 400 can be supplemented with moving entities configured to exchange positioning data with the centralized processor.

Other embodiments of the invention are defined by the following clauses:

1. Ultra-wideband positioning system (100) for determining a position of at least one entity (200) on an airport field comprising at least one of a manoeuvring area (310, 320) and an apron (350), said system comprising:
   - at least one positioning unit (400), on or around the least one of the manoeuvring area (310, 320) and the apron (350), each positioning unit (400) comprising either:
   - a first ultra-wideband module (410) configured to transmit at least one ultra-wideband pulse radio outbound signal (501, 502), in particular in direction of the at least one entity (200) and to receive at least one ultra-wideband pulse radio signal (601, 602, 602', 603) sent spontaneously, returned or echoed by the at least one entity (200), or
   - a second ultra-wideband module (410) configured to receive at least one ultra-wideband pulse radio signal (601, 602, 602', 603) sent spontaneously, returned, or echoed by the at least one entity (200);
   - a position determining unit (700) in data communication with the at least one positioning unit (400), said position determining unit (700) being configured to calculate the position of the at least one entity (200) using positioning data extracted at least from the at least one ultra-wideband pulse radio signal (601, 602, 602', 603) sent spontaneously, returned or echoed by the at least one entity (200).
2. Ultra-wideband positioning system (100) of clause 1, comprising at least one airfield element selected for the group comprising:
   - an airport signalling device (801), in particular a runway light, a taxiway light, elevated light, approach light, visual docking guidance system or sign, or
   - an airport surveillance stationary device (802), in particular a multilateration antenna mast;

wherein the at least one positioning unit (400) is arranged in or on the at least one airfield element.

3. Ultra-wideband positioning system (100) of any one of the preceding clauses, wherein the at least one entity (200) comprises at least one moving entity (200) on the airfield, preferably an airplane (200), a ground vehicle (200), a mobile phone (200) or a pedestrian (200) wearing a tag, preferably said entity (200) being provided with an ultra-wideband communication module (210) configured to exchange at least one of identification and position data with the ultra-wideband positioning system (100).

4. Ultra-wideband positioning system (100) of any one of the preceding clauses, wherein the at least one entity comprises at least one fix entity (200), in particular Foreign Object Debris (FOD) (200).

5. Ultra-wideband positioning system (100) of any one of the preceding clauses, wherein the at least one ultra-wideband pulse radio outbound signal comprises a first ultra-wideband pulse outbound signal (501) transmitted by the at least one positioning unit (400), said signal (501) being a ranging signal, and the at least one ultra-wideband pulse radio signal (601, 602, 602', 603) sent spontaneously, returned or echoed by the at least one entity (200) comprises a first ultra-wideband pulse radio signal (601) echoed by the at least one entity (200), said signal (200) being an echoed signal of the said first signal bouncing back on the at least one entity (200).

6. Ultra-wideband positioning system (100) of any one of the preceding clauses, wherein the position determining unit (700) is configured to determine a range of the least one entity (200) relative to the at least one positioning unit (400) using a time of flight of the at least one ultra-wideband pulse radio outbound (501, 502) and the at least one ultra-wideband pulse radio signal (601, 602) returned or echoed signals (601, 602) by the least one entity (200).

7. Ultra-wideband positioning system (100) of any one of the preceding clauses, wherein the at least one ultra-wideband pulse radio outbound signal comprises a second ultra-wideband pulse outbound signal (502) transmitted by the at least one positioning unit (400), said signal being a poll signal, and the at least one ultra-wideband pulse radio signal (601, 602, 602', 603) sent spontaneously, returned or echoed by the at least one entity (200) comprises a second ultra-wideband pulse signal (602) returned by the at least one entity (200), said signal (602) being a response signal sent by the at least one entity (200).

8. Ultra-wideband positioning system (100) of any one of the preceding clauses, wherein the at least one ultra-wideband pulse radio signal (602, 602') spontaneously sent or returned (602, 602') by the at least one entity (200), in particular the second ultra-wideband pulse radio signal (602) returned, comprises position data of the at least one entity (200) and the ultra-wideband positioning system (100) is configured to transfer the position data from the second positioning (400) unit to the position determining unit (700).

9. Ultra-wideband positioning system (100) of any one of the preceding clauses, wherein the at least one positioning unit (400) comprises at least three positioning units (400), wherein the at least one ultra-wideband pulse radio signal (601, 602, 602', 603) sent spontaneously, returned or echoed by the at least one entity (200) comprises a third ultra-wideband pulse radio (603) signal sent spontaneously or returned by the at least one entity (200) being received by the at least three positioning units and the position determining unit (700) being configured to determine the position of the at least one entity (200) using the time difference of arrivals of the third ultra-wideband pulse radio signal sent spontaneously or returned by at the at least three positioning units (400).

10. Ultra-wideband positioning system (100) of any one of the preceding clauses, wherein the at least one ultra-wideband pulse radio signal (601, 602, 602', 603) sent spontaneously, returned or echoed by the at least one entity (200) comprises a fourth ultra-wideband pulse signal sent spontaneously or returned by the at least one entity (200) being received by the first or second ultra-wideband module (410) of the at least one positioning unit (400), said first or second ultra-wideband module (410) comprising a multi-antenna receiver with at least two antennas and the position determining unit (700) is configured to determine the position of the at least one entity using the phase difference of arrivals of the fourth ultra-wideband pulse radio signal sent spontaneously or returned by the at least one entity (200) at the at least two antennas.

11. Ultra-wideband positioning system (100) of any one of the preceding clauses, wherein the at least one positioning unit (400) comprises a first communication unit (460) that is configured for ultra-wideband data communication with the at least one entity (200) or with another one of the at least one positioning unit (400), preferably through the first or second ultra-wideband module (410) of the at least one positioning unit (400).

12. Ultra-wideband positioning system (100) of any one of the preceding clauses, wherein the at least one positioning unit comprises at least a first group of the positioning units arranged in cluster like structure to cover a first zone of interest, said ultra-wideband positioning system (100) comprising a first relay communication unit (450), wherein a first positioning unit of the first group is positioned within a ultra-wideband coverage range of the first relay communication unit (450), said first relay communication unit (450) being operably coupled to the positioning determination unit (700) and configured for data communication with the first positioning unit (400) of the first group using ultra-wideband signals.

13. Ultra-wideband positioning system (100) of any one of the preceding clauses, wherein the minimal distance between any pair of directly adjacent positioning units (400) of the first group is greater than or equal to 11 meters, preferably 15 meters, in particular 20 meters.

14. Ultra-wideband positioning system (100) of any one of the preceding clauses, wherein the first group of positioning units (400) are positioned along a first path, preferably rectilinear, and/or a proximal or distal positioning unit (400) of said first group being the first positioning unit (400) of said first group.

15. Ultra-wideband positioning system (100) of any one of the preceding clauses, wherein the first path is arranged:

in a central line of one of a runway (310), taxiway (320) and an apron (350), and/or along one or both opposite sides of the one of a runway (310), taxiway (320) and an apron (350);

the first group of positioning units (400) being disposed on or in aeronautical ground lights (801) of said central line and/or said opposite sides.

16. Ultra-wideband positioning system (100) of any one of the preceding clauses, wherein the at least one positioning unit (400) comprises a second group of the positioning units arranged in cluster like structure to cover a second zone of interest, said ultra-wideband positioning system (100) further comprising a second relay communication unit (450), wherein a first positioning unit (400) of the second group is positioned within a given distance form the second relay communication unit (450) so as to remain in the limit of the ultra-wideband coverage of the second group, said first relay communication unit (450) being operably coupled to the positioning determination unit (700) and configured for data communication with the first positioning unit (400) of the second group using ultra-wideband signals.

17. Ultra-wideband positioning system of any one of the preceding clauses, wherein the minimal distance between any pair of directly adjacent positioning units (400) of the second group is greater than or equal to 11 meters, preferably 15 meters, in particular 20 meters.

18. Ultra-wideband positioning system (100) of any one of the preceding clauses, wherein the second group of positioning units (400) are positioned along a second path, preferably rectilinear, and/or a proximal or distal positioning unit (400) of said second group is the first positioning unit (400) of the second group.

19. Ultra-wideband positioning system (100) of any one of the preceding clauses, wherein the first path is substantially parallel to the second path, preferably both paths being arranged on opposite long sides of the one of the runway (310), taxiway (320) and/or apron (350) and are disposed in aeronautical ground side lights (801) of said opposed sides.

20. Ultra-wideband positioning system (100) of any one of the preceding clauses, wherein one of the positioning units (400) of the first group and one of the positioning units (400) of the second group are configured for data communication between one another.

21. Ultra-wideband positioning system (100) of any one of the preceding clauses, comprising a power source and a power supply line connecting the power source with the at least one positioning unit (400), and preferably the first and/or second relay communication units (450).

22. Ultra-wideband positioning system (100) of any one of the preceding clauses, wherein the at least one positioning unit (400) comprises a second communication device (470) coupled to the power supply line, and wherein the position determining unit (700) is coupled to the power supply line and is configured for data communication with the second communication device (460) via the power supply line.

23. Ultra-wideband positioning system (100) of any one of the. preceding clauses, wherein the at least one positioning unit (400) includes a third communication device or unit (480) configured to exchange data wirelessly, in particular WiFi, LTE 4G, LTE 5G with the position determining unit.

24. Surveillance system for an airport field, comprising at least one ultra-wideband positioning system (100) according to any one of the preceding clauses, said ultra-wideband positioning system (100) comprising a position determining unit (700) and at least one positioning unit (400), said surveillance system further comprising a central monitoring unit (900) being configured to monitor at least one entity (200) on the airport field including at least one of a maneuvering area (310, 320) and an apron (350), said central monitoring unit (900) being configured for data communication with the position determining unit (700), said position determining unit (700) being configured to send ultra-wideband positioning data extracted from at least one ultra-wideband pulse radio signal (601, 602, 602', 603) sent spontaneously, returned or echoed by the at least one entity (200).

25. Surveillance system of the preceding clause, further comprising:

- a surface movement positioning system (1100) provided with at least one surface movement radar system (1400) operably connected to a surface movement positioning determining unit (1700), said positioning determining unit (1700) being in data communication with the central monitoring unit (900) for communicating surface movement positioning data from the at least one entity, and/or
- a multilateration positioning system (2000) provided with at least one multilateration antenna system (2400) operably connected to a multilateration positioning determining unit (2700), said positioning determining unit (2700) being in data communication with the central monitoring unit (900) for communicating multilateration positioning data from the at least one entity (200).

26. Surveillance system of clause 24 or 25, wherein the central monitoring unit (900) is configured to determine a position of the at least one entity using the merging of the ultra-wideband based positioning data and at least one of the multilateration positioning data and the surface movement positioning data.

27. Surveillance system of the previous clause, wherein the central monitoring unit (900) can be configured to validate the position of the at least one entity (200) based on the ultra-wideband positioning data, and optionally on the at least one of the multilateration positioning data and the surface movement positioning data.

28. Airport comprising an ultra-wideband positioning system (100) of any one of clauses 1 to 23 or comprising a surveillance system of any one of the clauses 24 to 27.

The invention claimed is:

1. Ultra-wideband positioning system for determining a position of at least one entity on an airport field comprising at least one of a manoeuvring area and an apron, said system comprising:

at least one airport light-signalling device, selected from a group consisting of an approach light, a runway light, a taxiway light, an elevated light, an inset light, a light box, and a visual docking guidance system, said device being located on or around the least one of the manoeuvring area and the apron;

wherein the at least one airport light-signalling device comprises a positioning unit being arranged in or on the at least one airport light-signalling device, said unit comprising an ultra-wideband module configured to at least:

transmit at least one ultra-wideband pulse radio outbound signal, and to receive at least one ultra-wideband pulse radio signal sent spontaneously, returned or echoed by the at least one entity, or receive at least one ultra-wideband pulse radio signal sent spontaneously, returned, or echoed by the at least one entity;

a position determining unit in data communication with the positioning unit of the at least one airport light-signalling device, said position determining unit being configured to calculate the position of the at least one entity using positioning data extracted at least from the at least one ultra-wideband pulse radio signal sent spontaneously, returned or echoed by the at least one entity;

wherein the at least one entity comprises at least one first entity, wherein the positioning data are first positioning data, wherein the positioning unit of the at least one airport light-signalling device further comprises at least one communication unit for wire or wireless communication, said unit being configured to transfer first positioning data to the position determining unit, a computing unit configured to receive and accumulate first raw positioning detection data received from the ultra-wideband module, to process the first raw positioning data and to deliver the first positioning data of the at least one first entity to said communication unit;

a power supply;

wherein the position determining unit comprises at least one communication unit configured to exchange data with said airport light-signalling device;

a centralized processor being configured to receive the first positioning data of the at least one first entity send by the positioning unit of the at least one airport light-signalling device and to calculate a first positioning of the at least one first entity based on the first positioning data.

2. Ultra-wideband positioning system of claim 1, further comprising:

at least one airport visual-signalling device, or at least one airport surveillance stationary device being located on or around the least one of the manoeuvring area and the apron;

wherein the at least one airport visual-signalling device (801) or the at least one airport surveillance stationary device comprises a positioning unit being arranged in or on said device, said unit comprising an ultra-wideband module configured to at least:

transmit at least one ultra-wideband pulse radio outbound signal and to receive at least one ultra-wideband pulse radio signal sent spontaneously, returned or echoed by the at least one entity, or receive at least one ultra-wideband pulse radio signal sent spontaneously, returned, or echoed by the at least one entity, wherein the position determining unit is in data communication with the positioning unit of said device, said position determining unit being configured to calculate the position of the at least one entity using positioning data extracted at least from said ultra-wideband pulse radio signal sent spontaneously, returned or echoed by the at least one entity.

3. Ultra-wideband positioning system of claim 1, wherein the at least one entity comprises at least one moving entity on the airfield, selected from a group consisting of an airplane, a ground vehicle, a mobile phone and a pedestrian wearing a tag, said entity being provided with an ultra-wideband communication module configured to exchange at least one of identification and position data with the ultra-wideband positioning system.

4. Ultra-wideband positioning system of claim 1, wherein the at least one entity comprises a Foreign Object Debris.

5. Ultra-wideband positioning system of claim 1, wherein the at least one ultra-wideband pulse radio outbound signal comprises a first ultra-wideband pulse outbound signal transmitted by the positioning unit of the at least one airport light-signalling device, said signal being a ranging signal, and the at least one ultra-wideband pulse radio signal sent spontaneously, returned or echoed by the at least one entity comprises a first ultra-wideband pulse radio signal echoed by the at least one entity, said signal being an echoed signal of the said first signal bouncing back on the at least one entity.

6. Ultra-wideband positioning system of claim 1, wherein the position determining unit or the positioning unit of the at least one airport light-signalling device is configured to determine a range of the least one entity relative to the positioning unit of the at least one airport light-signalling device using a time of flight of the at least one ultra-wideband pulse radio outbound and the at least one ultra-wideband pulse radio signal returned or echoed signals by the least one entity.

7. Ultra-wideband positioning system of claim 1, wherein the at least one ultra-wideband pulse radio outbound signal comprises a second ultra-wideband pulse outbound signal transmitted by the positioning unit of the at least one airport light-signalling device, said signal being a poll signal, and the at least one ultra-wideband pulse radio signal sent spontaneously, returned or echoed by the at least one entity comprises a second ultra-wideband pulse signal returned by the at least one entity, said signal being a response signal sent by the at least one entity.

8. Ultra-wideband positioning system of claim 7, wherein the second ultra-wideband pulse radio signal returned, comprises position data of the at least one entity and the ultra-wideband positioning system is configured to transfer the position data from the positioning unit of the at least one airport light-signalling device to the position determining unit.

9. Ultra-wideband positioning system of claim 1, wherein the positioning unit of the at least one airport light-signalling device comprises at least three positioning units, wherein the at least one ultra-wideband pulse radio signal sent spontaneously, returned or echoed by the at least one entity comprises a third ultra-wideband pulse radio signal sent spontaneously or returned by the at least one entity being received by the at least three positioning units and the position determining unit being configured to determine the position of the at least one entity using the time difference of arrivals of the third ultra-wideband pulse radio signal sent spontaneously or returned by the at least three positioning units.

10. Ultra-wideband positioning system of claim 1, wherein the at least one ultra-wideband pulse radio signal sent spontaneously, returned or echoed by the at least one entity comprises a fourth ultra-wideband pulse signal sent spontaneously or returned by the at least one entity being received by the ultra-wideband module of the positioning unit of the at least one airport light-signalling device, said ultra-wideband module comprising a multi-antenna receiver with at least two antennas and the position determining unit or the positioning unit of the at least one airport light-signalling device is configured to determine the position of the at least one entity using the phase difference of arrivals of the fourth ultra-wideband pulse radio signal sent spontaneously or returned by the at least one entity at the at least two antennas.

11. Ultra-wideband positioning system of claim 1, wherein the first communication unit is configured for ultra-wideband data communication with another one of the positioning unit of the at least one airport light-signalling device, through the ultra-wideband module of the at least one positioning unit.

12. Ultra-wideband positioning system of claim 1, wherein the positioning unit of the at least one airport light-signalling device comprises at least a first group of the positioning units arranged in cluster like structure to cover a first zone of interest, said ultra-wideband positioning system comprising a first relay communication unit, wherein a first positioning unit of the first group is positioned within a ultra-wideband coverage range of the first relay communication unit, said first relay communication unit being operably coupled to the positioning determination unit and configured for data communication with the first positioning unit of the first group using ultra-wideband signals.

13. Ultra-wideband positioning system of claim 1, further comprising:

at least one airport visual-signalling device or at least one airport surveillance stationary device being located on or around the least one of the manoeuvring area and the apron;

wherein the at least one airport visual-signalling device or the at least one airport surveillance stationary device comprises a positioning unit being arranged in or on said device, said unit comprising an ultra-wideband module configured to at least:

transmit at least one ultra-wideband pulse radio outbound signal and to receive at least one ultra-wideband pulse radio signal sent spontaneously, returned or echoed by the at least one entity, or receive at least one ultra-wideband pulse radio signal sent spontaneously, returned, or echoed by the at least one entity, wherein the position determining unit is in data communication with the positioning unit of the at least one airport visual-signalling device or the at least one airport surveillance stationary device, said position determining unit being configured to calculate the position of the at least one entity using positioning data extracted at least from said ultra-wideband pulse radio signal sent spontaneously, returned or echoed by the at least one entity, as received by the positioning unit of said airport visual-signalling device or said airport surveillance stationary device, wherein the positioning unit of the at least one at least one airport visual-signalling device or the at least one airport surveillance stationary device, further comprises at least one communication unit for wire or wireless communication, said unit being configured to transfer second positioning data to the position determining unit, a computing unit configured to receive and accumulate second raw positioning detection data received from the ultra-wideband module, to process the second raw positioning data and to deliver the second positioning data of the at least one first entity to said communication unit;

a power supply;

wherein the at least one communication unit of the position determining unit is configured to exchange data with said airport visual-signalling device or said airport surveillance stationary device and the centralized processor is configured to receive the second positioning data of the at least one first entity sent by the positioning unit of said airport visual-signalling device or said airport surveillance stationary device and to calculate the positioning of the at least one first entity based on the second positioning data.

14. Ultra-wideband positioning system of claim 1, wherein the at least one entity comprises at least one second entity, said system comprising the at least one second entity, wherein the at least one second entity is configured to receive at least one ultra-wideband pulse radio signal emitted or echoed by the at least one first entity, to transform said signal into third positioning data of the at least first entity and to transfer the third positioning data directly to the position determining unit or via the positioning unit of the at least one airport light-signalling device;

wherein the at least one communication unit of the position determining unit is configured to exchange data with the at least one second entity and the centralized processor is configured to receive the third positioning data of the at least one first entity send by the least one second entity, and to calculate the positioning of the at least one first entity based on the third positioning data.

15. Ultra-wideband positioning system of claim 1, wherein the at least one airport light-signalling device comprises a controlling unit for controlling at least one light source, said controlling unit being connected to a first interface, wherein the positioning unit of the at least one airport light-signalling device comprises a second interface connected to the computing unit of the at least one airport light-signalling device, wherein the first and second interfaces being operatively connected in use.

16. Ultra-wideband positioning system of claim 1, wherein the centralized processor is configured to compare the positioning data sent by the positioning unit of the at least one airport light-signalling device with data containing the predefined location of the at least one airport light-signalling device.

17. Ultra-wideband positioning system of claim 1, wherein the positioning unit of the at least one airport light-signalling device comprises a first communication unit that is configured for ultra-wideband data communication with the at least one entity.

18. Surveillance system for an airport field, comprising at least one ultra-wideband positioning system for determining a position of at least one entity on an airport field comprising at least one of a manoeuvring area and an apron, said positioning system comprising:

at least one airport light-signalling device, said device being located on or around the least one of the manoeuvring area and the apron;

wherein the at least one airport light-signalling device comprises a positioning unit being arranged in or on the at least one airport light-signalling device, said unit comprising an ultra-wideband module configured to at least:

transmit at least one ultra-wideband pulse radio outbound signal and to receive at least one ultra-wideband pulse radio signal sent spontaneously, returned or echoed by the at least one entity, or receive at least one ultra-wideband pulse radio signal sent spontaneously, returned, or echoed by the at least one entity;

a position determining unit in data communication with the positioning unit of the at least one airport light-signalling device, said position determining unit being configured to calculate the position of the at least one entity using positioning data extracted at least from the at least one ultra-wideband pulse radio signal sent spontaneously, returned or echoed by the at least one entity, wherein the positioning unit of the at least one airport light-signalling device comprises a first communication unit that is configured for ultra-wideband data communication with the at least one entity, wherein the surveillance system further comprises a central monitoring unit being configured to monitor at least one entity on the airport field including at least one of the manoeuvring area and the apron, said central monitoring unit being configured for data communication with the position determining unit, said position determining unit being configured to send ultra-wideband positioning data extracted from positioning data received from the positioning unit of the at least one at least one airport light-signalling device.

19. Surveillance system of claim 18, further comprising at least one of:

a surface movement positioning system provided with at least one surface movement radar system operably connected to a surface movement positioning determining unit, said positioning determining unit being in data communication with the central monitoring unit for communicating surface movement positioning data from the at least one entity, and a multilateration positioning system provided with at least one multilateration antenna system operably connected to a multilateration positioning determining unit, said positioning determining unit being in data communication with the central monitoring unit for communicating multilateration positioning data from the at least one entity, wherein the central monitoring unit is configured to determine a position of the at least one entity using the merging of the ultra-wideband based positioning data and at least one of the multilateration positioning data and the surface movement positioning data.

20. Surveillance system of claim 19, wherein the central monitoring unit can be configured to validate the position of the at least one entity based on the ultra-wideband positioning data, and optionally on the at least one of the multilateration and Automatic Dependent Surveillance-Broadcast positioning data and the surface movement positioning data.

* * * * *